United States Patent
Kondou et al.

(10) Patent No.: US 9,131,175 B2
(45) Date of Patent: Sep. 8, 2015

(54) SOLID STATE IMAGING APPARATUS, ELECTRONIC APPARATUS, AND PIXEL READING METHOD

(71) Applicant: Sony Corporation, Tokyo (JP)

(72) Inventors: Kenya Kondou, Fukuoka (JP); Haruhisa Naganokawa, Kanagawa (JP); Daijiro Anai, Fukuoka (JP); Makoto Aoki, Kanagawa (JP); Syouhei Taguchi, Fukuoka (JP); Ken Koseki, Kanagawa (JP); Nobuo Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 53 days.

(21) Appl. No.: 13/926,613

(22) Filed: Jun. 25, 2013

(65) Prior Publication Data

US 2014/0009657 A1    Jan. 9, 2014

(30) Foreign Application Priority Data

Jul. 5, 2012    (JP) ................................ 2012-151662

(51) Int. Cl.
H04N 5/369    (2011.01)

(52) U.S. Cl.
CPC .................... H04N 5/3696 (2013.01)

(58) Field of Classification Search
CPC .. H04N 5/23212; H04N 5/335; H04N 5/3696
USPC .................................. 348/345, 294; 257/291
See application file for complete search history.

(56) References Cited

U.S. PATENT DOCUMENTS

| 6,657,669 | B1 * | 12/2003 | Sato et al. ..................... 348/350 |
| 7,049,571 | B2 * | 5/2006 | Nakata et al. ............... 348/222.1 |
| 2006/0104622 | A1 * | 5/2006 | Nakata .............................. 396/96 |
| 2008/0042048 | A1 * | 2/2008 | Asayama et al. ........... 250/208.1 |
| 2010/0245631 | A1 * | 9/2010 | Hoda et al. ..................... 348/241 |
| 2011/0013060 | A1 * | 1/2011 | Sato et al. ..................... 348/294 |
| 2012/0050584 | A1 * | 3/2012 | Saito et al. ..................... 348/308 |

FOREIGN PATENT DOCUMENTS

JP    2006-285013    10/2006

* cited by examiner

*Primary Examiner* — Nhan T Tran
(74) *Attorney, Agent, or Firm* — Dentons US LLP

(57) ABSTRACT

There is provided a solid state imaging apparatus, including a plurality of line sensors including a plurality of pixels arrayed in a line, each of the pixels including an amplifier which amplifies a signal corresponding to a charge accumulated in a photoelectric transducer, and signal lines each for reading a signal of each pixel of the line sensors. The plurality of line sensors are discretely arranged, and the signal lines are gathered and wired along a region in which a circuit block including the line sensors is arranged.

14 Claims, 14 Drawing Sheets

SOLID STATE IMAGING APPARATUS, ELECTRONIC APPARATUS, AND PIXEL READING METHOD

BACKGROUND

The present disclosure relates to a solid state imaging apparatus, an electronic apparatus, and a pixel reading method, and more specifically to a solid state imaging apparatus, an electronic apparatus, and a pixel reading method which can provide suitable line sensors in an AF sensor.

In recent years, a phase difference detection system, which applies the principle of triangulation, has been used by digital single-lens reflex cameras in order to implement an automatic focus (AF) function which automatically adjusts the focus.

A phase difference detection system is a system which acquires two photographic subjects by splitting light made incident to an imaging lens into two light beams with a lens separator, and which controls the driving of the imaging lens to be focused by calculating a deviation amount of the focus from the spacing between these images.

An AF sensor configured to have a plurality of line sensors, in which pixels performing photoelectric conversion are arrayed in a line shape, discretely arranged in accordance with a focal point has been used in an imaging apparatus which provides an AF function using such a phase difference detection system.

For example, a solid state imaging apparatus for AF has been proposed as an AF sensor to increase the reading speed by arranging two output circuits corresponding to two line sensors adjacent to each other (for example, JP 2006-285013A).

SUMMARY

Incidentally, a CCD (Charge Coupled Device) is used in line sensors which constitute an AF sensor in the related art. The CCD transfers a signal charge generated in a unit pixel by incident light to an output circuit by a charge transfer function without amplifying the signal charge.

An amplifier called an FD (Floating Diffusion) amplifier is used in the output circuit. Generally, an FD amplifier is installed in each line sensor, and the signal charges (pixel signals) transferred by the CCD are sequentially amplified and output.

Accordingly, even if signal reading is performed simultaneously for two line sensors used as a pair in an AF sensor using a CCD, the quality of the signals may deteriorate due to disturbances or the like which occur in the processes of holding, transferring and amplifying of signals performed in analog. That is, it is difficult to maintain noise immunity and to maintain uniformity (simultaneity) of the pixel signals of paired line sensors in an AF sensor using a CCD.

Further, while the pixel signals are sequentially transferred and amplified in an AF sensor using a CCD, this processing speed is determined by the transfer speed of the CCD and the frequency response of the FD amplifier, and is not easy to increase the processing speed.

As a result, these points have led to a decrease in precision of the AF operation in an AF sensor using a CCD, and a decrease in the tracking of the AF function for a photographic subject moving at high speed.

The present disclosure is performed by considering such a situation, and can provide more suitable line sensors in an AF sensor.

According to an embodiment of the present disclosure, there is provided a solid state imaging apparatus, including a plurality of line sensors including a plurality of pixels arrayed in a line, each of the pixels including an amplifier which amplifies a signal corresponding to a charge accumulated in a photoelectric transducer, and signal lines each for reading a signal of each pixel of the line sensors. The plurality of line sensors are discretely arranged, and the signal lines are gathered and wired along a region in which a circuit block including the line sensors is arranged.

A distance between the gathered and wired signal lines may be narrower than a distance between the pixels arrayed in the line sensors.

The solid state imaging apparatus may further include a parallel type A/D convertor capable of A/D converting the signal of each pixel of the plurality of line sensors in parallel. The signal lines may connect each pixel of the plurality of line sensors to the A/D convertor.

The A/D convertor A/D may convert the signal of each pixel of all the line sensors in parallel.

The plurality of line sensors may each be selectively operated, the signal lines may connect each pixel of the plurality of line sensors to the A/D convertor by sharing wiring on the A/D convertor side for each corresponding pixel between the plurality of line sensors, and the A/D convertor A/D may convert the signal of each pixel of the selected line sensors in parallel.

In the signal lines on a wiring part which is not shared with the pixels of other line sensors, a switch may be provided which controls connection and disconnection between each pixel and the A/D convertor for each line sensor, and the A/D convertor A/D may convert the signal of each pixel of the line sensors corresponding to the signal lines where the switch is turned on in parallel.

The solid state imaging apparatus may further include a line memory which holds a digital signal output by the A/D convertor.

The solid state imaging apparatus may further include a signal processing circuit which applies a prescribed signal process to a digital signal output by the A/D convertor.

A shield line connected to a power supply potential or a ground potential may be additionally wired close to a region where the signal lines are gathered and wired.

In a case where at least some of the plurality of line sensors are arranged in parallel and adjacent to each other, the signal lines each reading the signal of each pixel of one of the line sensors may be wired extending over the other line sensors.

One of the line sensors of the plurality of line sensors may be arranged in a pair with another of the line sensors, and the paired line sensors may be arranged so that pixel lines arrayed in each of the paired line sensors are arrayed in a line in a prescribed direction.

The line sensors may be complementary metal oxide semiconductor (CMOS) image sensors.

According to an embodiment of the present disclosure, there is provided an electronic apparatus, including a solid state imaging apparatus including a plurality of line sensors including a plurality of pixels arrayed in a line, each of the pixels including an amplifier which amplifies a signal corresponding to a charge accumulated in a photoelectric transducer, and signal lines each for reading a signal of each pixel of the line sensors. The plurality of line sensors are discretely arranged, and the signal lines are gathered and wired along a region in which a circuit block including the line sensors is arranged.

According to an embodiment of the present disclosure, there is provided a method for reading pixels performed by a solid state imaging apparatus, the solid state imaging apparatus including a plurality of line sensors including a plurality of pixels arrayed in a line, each of the pixels including an amplifier which amplifies a signal corresponding to a charge accumulated in a photoelectric transducer, signal lines each for reading a signal of each pixel of the line sensors, a parallel type A/D convertor capable of A/D converting the signal of each pixel of the plurality of line sensors in parallel, and a switch provided on the line sensors side of the signal lines, the switch controlling connection and disconnection between each pixel and the A/D convertor for each line sensor. The plurality of line sensors are discretely arranged, and the signal lines are gathered and wired along a region in which a circuit block including the line sensors is arranged, and which connect each pixel of the plurality of line sensors to the A/D convertor by sharing wiring on the A/D convertor side for each corresponding pixel between the plurality of line sensors. The method includes A/D converting the signal of each pixel of the line sensors corresponding to the signal lines where the switch is turned on in parallel.

In an embodiment according to the present disclosure, a plurality of line sensors are discretely arranged, and signal lines are gathered and wired along a region in which a circuit block including the line sensors is arranged.

According to an embodiment of the present disclosure, it becomes possible to provide more suitable line sensors in an AF sensor.

DETAILED DESCRIPTION OF THE EMBODIMENT(S)

Figure 1:
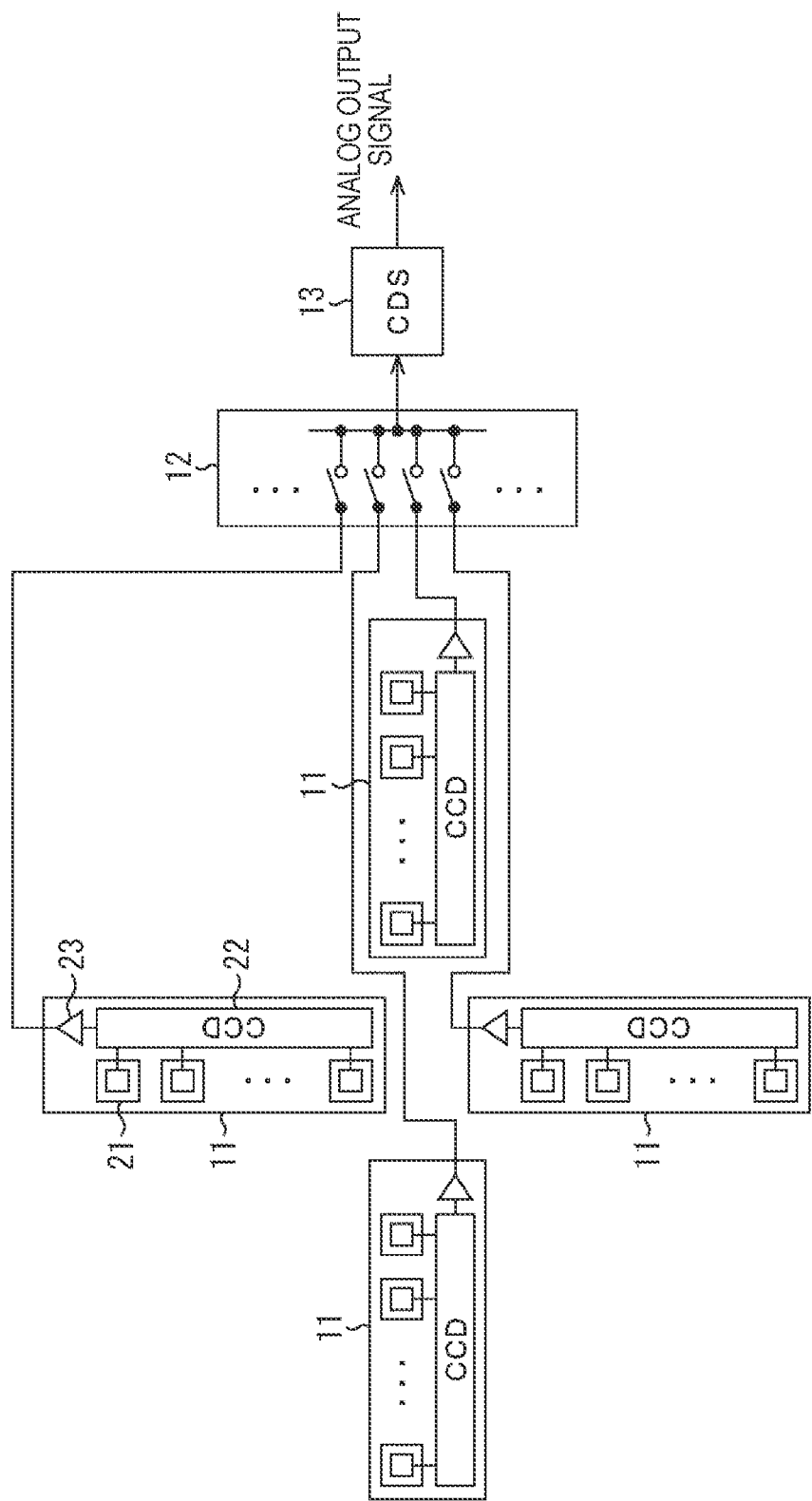
FIG. 1 is a figure which shows a configuration example of an AF sensor of the related art.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

First a configuration of the related art will be described before the embodiments of the present disclosure are described.

[Configuration Example of an AF Sensor of the Related Art]

FIG. 1 is a figure which shows a configuration example of an AF (Auto Focus) sensor of the related art using a CCD.

The AF sensor of FIG. 1 includes four line sensors 11, an output switching switch 12, and an output circuit 13.

In the AF sensor of FIG. 1, the two line sensors 11 formed in the horizontal direction are respectively arranged as a pair, and the two line sensors 11 formed in the vertical direction are respectively arranged as a pair.

In each line sensor 11, unit pixels 21 which include a photodiode, which is a photoelectric transducer, are arrayed in a line (in a line shape), and each of the unit pixels 21 converts incident light to a signal charge, and outputs the signal charge to a CCD shift register 22. The CCD shift register 22 sequentially transfers the signal charges output from each of the unit pixels 21 to a FD (Floating Diffusion) amplifier 23. An FD amplifier 23 is installed in each line sensor 11, and sequentially amplifies the signal charges (pixel signals) transferred from the CCD shift register 22 and outputs the amplified signal charges to the output switching switch 12.

The output switching switch 12 selects the outputs from each line sensor 11 in a prescribed order, and supplies the outputs to the output circuit 13.

The output circuit 13 is configured so as to include at least a CDS (Correlated Double Sampling) circuit, and performs correlated double sampling. In this way, the noise components included in the output from each unit pixel 21 are removed.

While simultaneity of the pixel signals between paired line sensors is important in an AF sensor, when the pixel signals from the pair of two line sensors 11 are read in the configuration shown in FIG. 1, since the noise components superimposed due to disturbances during transfer by the CCD shift register 22 are different between the paired line sensors 11, the noise components are not removed by the CDS circuit. That is, in the AF sensor of FIG. 1, simultaneity of the pixel signals between the paired line sensors is not able to be maintained.

On the other hand, JP 2006-285013A discloses arranging two output circuits corresponding to two line sensors adjacent to each other, and reading the pixel signals from the two line sensors in parallel. In this way, while attempts have been made to increase the speed of the AF, since the pixel signals from the line sensors are transferred sequentially by a vertical shift register constituted of a CCD, the processing speed of the AF is determined by the transfer speed of the CCD and the operation speed of the output circuit, and therefore obstructs further increases in the processing speed of the AF.

Further, since a power supply voltage exceeding 10V may be necessary in this operation, and since a plurality of power supplies for a plurality of peripheral circuits may also be necessary, the power consumption of an AF sensor using a CCD will increase. In addition, when it may be necessary to have a special process for this manufacturing, and when it may be necessary to operate a plurality of peripheral circuits in combination with each other, an AF sensor using a CCD will become a very complex system.

In this way, in an AF sensor of the related art, there is a problem of achieving security of noise immunity and simultaneity of the pixel signals of the line sensors, and achieving an increase in reading speed. The following two points can be included as causes of this.

1. Pixel signals of all the pixels within the line sensors are not able to be simultaneously read.

2. Signal reading is performed with an analog signal as it is which has low noise immunity.

Accordingly, hereinafter a configuration of an AF sensor will be described, which eliminates the causes of the above described two points, and which achieves security of noise immunity and simultaneity of the pixel signals of the line sensors and achieves an increase in the reading speed.

[First Embodiment of a Solid State Imaging Apparatus Applicable to the Present Disclosure]

Figure 2:
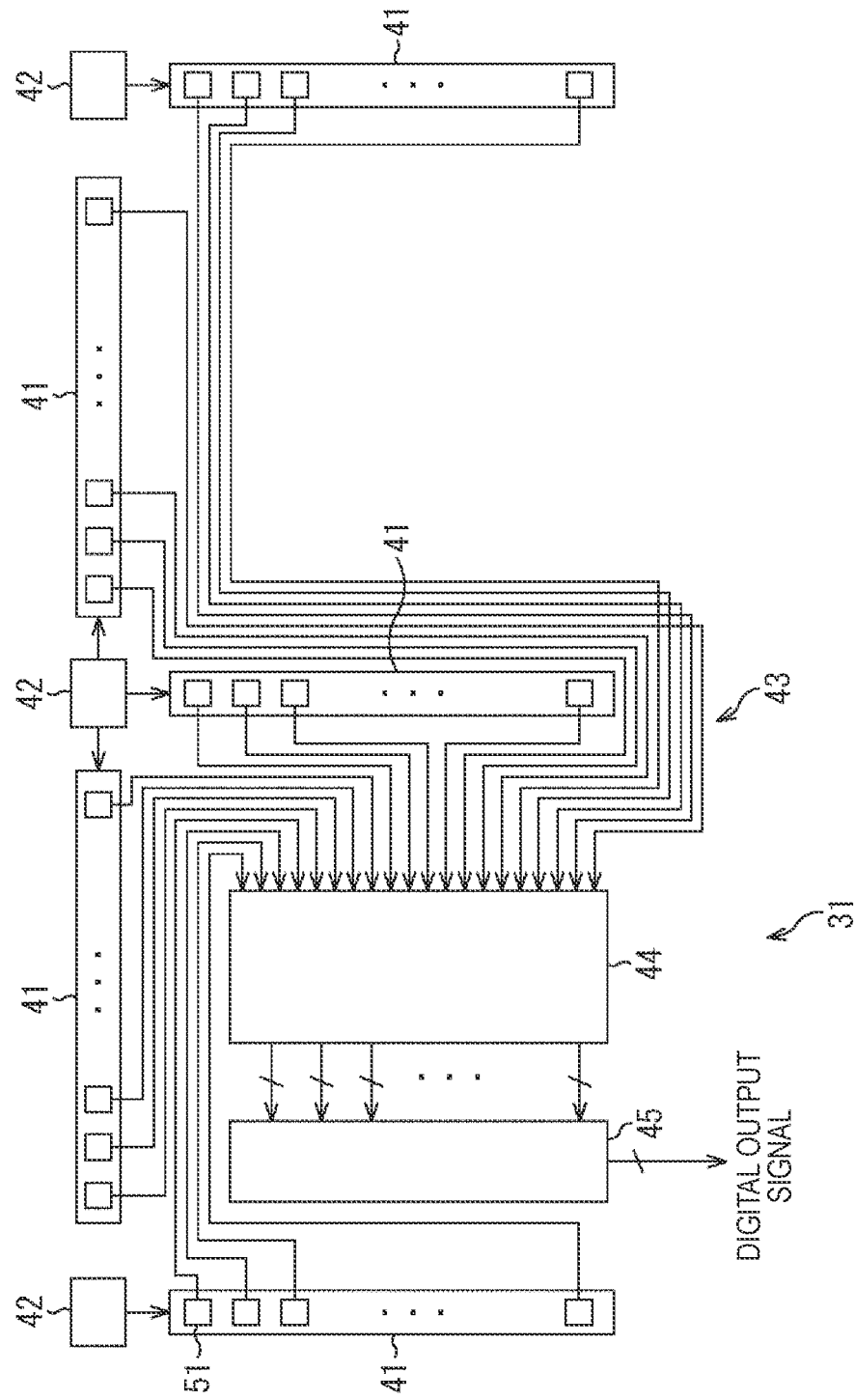
FIG. 2 is a figure which shows a configuration example of a first embodiment of a solid state imaging apparatus applicable to the present disclosure.

FIG. 2 is a figure which shows a configuration example of a first embodiment of a solid state imaging apparatus applicable to the present disclosure.

The solid state imaging apparatus 31 of FIG. 2 includes five line sensors 41, a pixel driving section 42, pixel signal lines 43, a column ADC (Analog Digital Convertor) 44, and a line memory 45.

The line sensors 41 are discreetly arranged, that is, are dispersed and arranged while having some regularity, on a chip included in the solid state imaging apparatus 31, and include the same number of unit pixels 51. The prescribed number of the unit pixels 51 are arrayed in a line in the line sensors 41. The line sensors 41 are configured as CMOS (Complementary Metal Oxide Semiconductor) image sensors.

Figure 3:
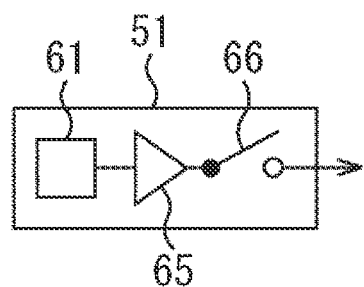
FIG. 3 is a schematic diagram which shows a configuration of a unit pixel.

Here, a configuration of the unit pixels 51 will be described with reference to FIGS. 3 and 4. FIG. 3 is a schematic diagram which shows a configuration of a unit pixel 51, and FIG. 4 is a figure which shows a configuration example of a unit pixel 51.

First, as shown in FIG. 3, the unit pixel 51 includes at least a photoelectric transducer 61, an amplifier 65, and a switch 66. In the unit pixel 51, the photoelectric transducer 61 accumulates a signal charge in accordance with an amount of incident light, and the amplifier 65 amplifies a pixel signal corresponding to this signal charge. The switch 66 outputs the amplified pixel signal in accordance with a driving signal from the pixel driving section 42.

Figure 4:
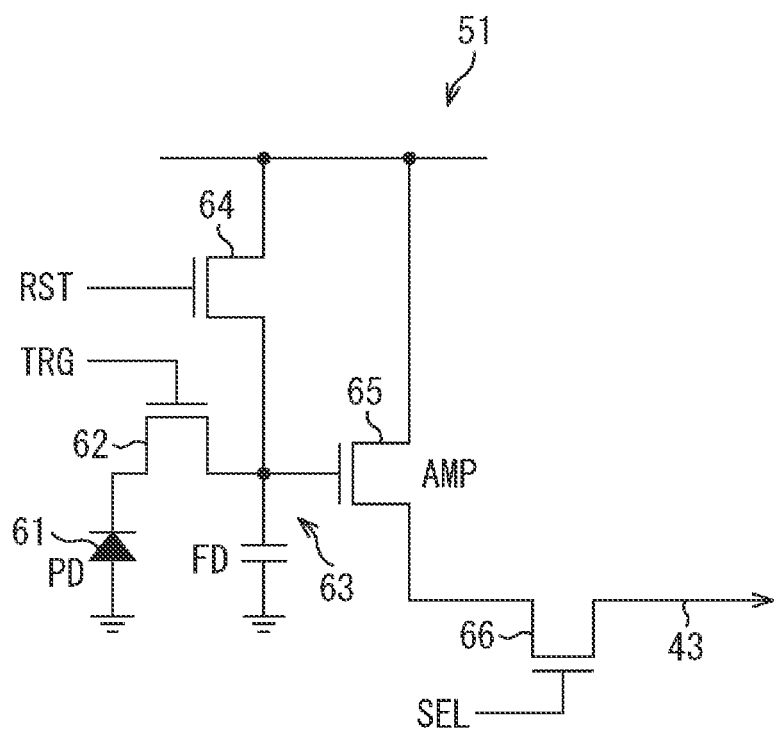
FIG. 4 is a figure which shows a specific configuration example of a unit pixel.

The unit pixel 51 shown in FIG. 4 includes a photodiode (PD) 61, a transfer gate 62, a floating diffusion (FD) 63, a reset transistor 64, an amplification transistor 65, and a selection transistor 66. Note that the photodiode 61, the amplification transistor 65, and the selection transistor 66 in FIG. 4 correspond to the photoelectric transducer 61, the amplifier 65, and the switch 66 in FIG. 3, respectively.

The anode of the photodiode 61 is grounded, and the cathode of the photodiode 61 is connected to the source of the transfer gate 62. The drain of the transfer gate 62 is connected to both the drain of the reset transistor 64 and the gate of the amplification transistor 65, and this connection point constitutes the FD 63.

The source of the reset transistor 64 is connected to a prescribed power supply, and the source of the amplification transistor 65 is also connected to the prescribed power supply. The drain of the amplification transistor 65 is connected to the source of the selection transistor 66, and the drain of the selection transistor 66 is connected to a pixel signal line 43.

The gate of the transfer gate 62, the gate of the reset transistor 64, and the gate of the selection transistor 66 are each connected to the pixel driving section 42 via a control line, which is not shown in the figure, and each is supplied with a pulse as a driving signal.

The photodiode 61 performs photoelectric conversion of incident light, and generates and accumulates a charge corresponding to this amount of light.

The transfer gate 62 turns the transfer of the charge from the photodiode 61 to the FD 63 on/off in accordance with a driving signal TRG supplied from the pixel driving section 42. For example, when an H (High) level driving signal TRG is supplied, the transfer gate 62 transfers the charge accumulated in the photodiode 61 to the FD 63, and when an L (Low) level driving signal TRG is supplied, the transfer gate 62 stops the transfer of the charge. Note that the charge to which the photodiode 61 performs photoelectric conversion is accumulated in the photodiode 61 while the transfer gate 62 stops the transfer of the charge to the FD 63.

The FD 63 accumulates the charge transferred from the photodiode 61 via the transfer gate 62, and converts the charge into a voltage. Note that the FD 63 functions as a charge holding section which holds the charge accumulated in the photodiode 61 during an exposure period.

The reset transistor 64 turns the discharge of the charge accumulated in the FD 63 on/off in accordance with a driving signal RST supplied from the pixel driving section 42. For example, when an H level driving signal RST is supplied, the reset transistor 64 clamps the FD 63 to a power supply voltage, and discharges (resets) the charge accumulated in the FD 63. Further, when an L level driving signal RST is supplied, the reset transistor 64 electrically floats the FD 63.

The amplification transistor 65 amplifies a voltage corresponding to the charge accumulated in the FD 63. The voltage (voltage signal) amplified by the amplification transistor 65 is output to a pixel signal line 43 via the selection transistor 66.

The selection transistor 66 turns the output of the voltage signal from the amplification transistor 65 to the pixel signal line 43 on/off in accordance with a driving signal SEL supplied from the pixel driving section 42. For example, when an H level driving signal SEL is supplied, the selection transistor 66 outputs the voltage signal to the pixel signal line 43, and when an L level driving signal SEL is supplied, the selection transistor 66 stops the output of the voltage signal.

In this way, the unit pixel 51 is driven in accordance with the driving signal TRG, the driving signal RST, and the driving signal SEL supplied from the pixel driving section 42.

Note that the unit pixel 51 is not limited to the configuration shown in FIG. 3, and can be another configuration.

Further, hereinafter the unit pixels 51 will simply be called the pixels 51.

Returning to the description of FIG. 2, the pixel driving section 42 drives the pixels 51 by supplying a driving signal to each pixel of the line sensors 41.

The pixel signal lines 43 are signal lines for reading the signals of each pixel 51 of each line sensor 41, and connect each pixel 51 to the column ADC 44.

As shown in FIG. 2, the pixel signal lines 43 are gathered and wired along a region in which a circuit block including the line sensor 41, that is, the line sensor 41, the column ADC 44, and the line memory 45, is arranged. The distance (pitch) between the gathered and wired pixel signal lines 43 is narrower than the distance between the pixels 51 arrayed in the line sensors 41.

The column ADC 44 is a parallel type column AD convertor, performs a parallel CDS process and AD conversion for the signals of each pixel 51 of each line sensor 41, and outputs (supplies) the pixel signals to the line memory 45 as digital signals.

The line memory 45 holds the digital signals supplied from the column ADC 44, and arbitrary outputs the held digital signals as necessary.

According to the above described configuration, since a CMOS image sensor including an amplifier in each pixel is used in the line sensors, and these pixel outputs are AD converted in parallel in the column ADC, the pixel signals of all the pixels within the line sensors can be simultaneously read, and signal reading is performed by a digital signal with a high noise immunity. In this way, it becomes possible to provide a more suitable solid state imaging apparatus in an AF sensor, which can eliminate the causes which obstruct security of noise immunity and simultaneity of the pixel signals of the line sensors, and which obstruct an increase in the reading speed.

Note that in the configuration of FIG. 2, the pixel signal lines 43 for each pixel 51 of the line sensors 41 increase in accordance with the number of pixels 51 in the line sensors 41 and the number of line sensors 41 on the chip. Further, since the line sensors 41 are discretely arranged on the chip, there is a significant restriction on the portions where the other circuit blocks (the column ADC 44, the line memory 45 and the like) are arranged.

Accordingly, since heretofore the pixel signal lines 43 for each pixel 51 are gathered and arranged along a region in which the line sensors 41 and other circuit blocks are arranged, it becomes possible to attempt a reduction of the chip size, which can connect all the pixels 51 to the column ADC 44, while securing the region in which the circuit blocks, such as the column ADC 44 and the line memory 45, are arranged.

Further, while a power supply voltage which is high for these operations may be necessary for an AF sensor using a CCD of the related art, according to the configuration of FIG. 2, since a CMOS is used, it becomes possible to have operations with a low power supply voltage, and as a result, it becomes possible to decrease the power consumption.

In addition, according to the configuration of FIG. 2, since parallel reading can be performed for all the line sensors 41, it becomes possible to take a high precision focus for a greater amount of focal points as an AF sensor.

Incidentally, as shown in FIG. 2, in the case where the pixel signal lines 43 are wired with a very narrow distance, it becomes easier for the pixel signals to be affected by crosstalk, due to the parasitic capacitance between the pixel signal lines 43, as the adjoining distances become longer. Further, in the case where the pixel signal lines 43 are wired in a wide range on the chip, it can be considered that the column ADC 44 and the signal lines of the other circuit blocks will be parallel or will intersect with each other.

In such a case, in the wiring layout, a shield line which is connected to a power supply potential or a ground potential may be wired close to the pixel signal lines 43, specifically, between the pixel signal lines 43, or may be wired to a wiring layer above or below the wiring layer in which the pixel signal lines 43 are arranged. In this way, it becomes possible to minimize the effects of crosstalk for the pixel signals due to parasitic capacitance between the pixel signal lines 43.

Note that the parasitic capacitance between each pixel signal line 43 and the shield line may occur due to wiring the shield line close to the pixel signal lines 43. On the other hand, the distance between the pixel signal lines 43 and the shield line, and the driving capacity of the amplifier installed in each pixel 51, may be adjusted so that the parasitic capacitance becomes an appropriate capacitance value, by taking into consideration the distance at which the pixel signal lines 43 are arranged, or a stabilization time (settling time) which may be necessary for the pixel signal lines 43.

[Second Embodiment of a Solid State Imaging Apparatus Applicable to the Present Disclosure]

Figure 5:
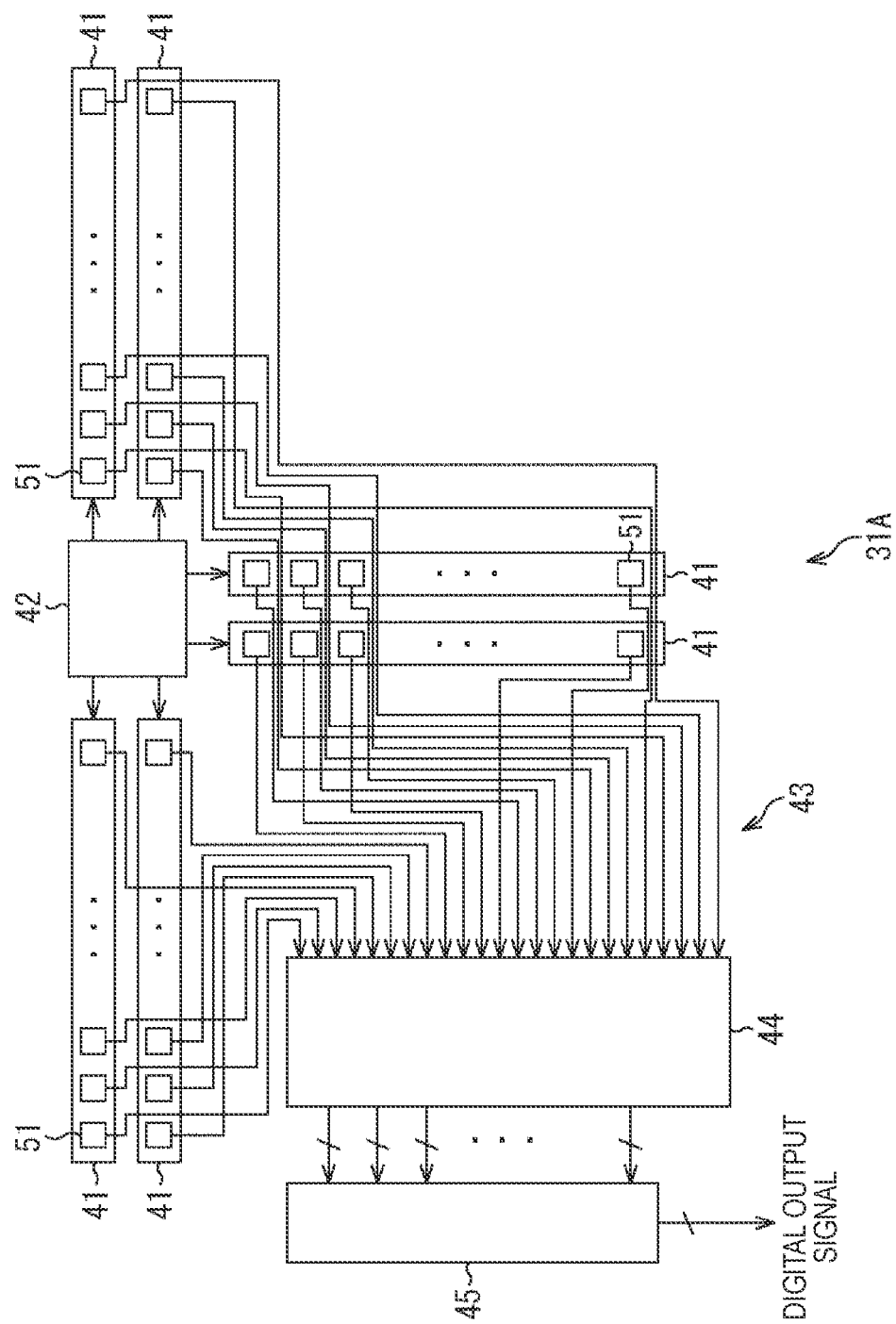
FIG. 5 is a figure which shows a configuration example of a second embodiment of a solid state imaging apparatus applicable to the present disclosure.

FIG. 5 is a figure which shows a configuration example of a second embodiment of a solid state imaging apparatus applicable to the present disclosure.

The Solid state imaging apparatus 31A of FIG. 5 includes six line sensors 41, a pixel driving section 42, pixel signal lines 43, a column ADC 44, and a line memory 45. Note that in FIG. 5 the same reference numerals are attached to parts having functions the same as those of FIG. 2, and a description of these parts will be arbitrary omitted.

In the solid state imaging apparatus 31A of FIG. 5, two line sensors 41 are arranged parallel and adjacent to each other. In addition, in the solid state imaging apparatus 31A of FIG. 5, the pixel signal lines 43 for reading the signal of each pixel 51 of one line sensor 41 (the line sensor 41 the furthest from the column ADC 44), out of the two line sensors 41 arranged parallel and adjacent to each other, are wired extending over the other line sensor 41 (the line sensor 41 nearest to the column ADC 44).

According to the above described configuration, functions and effects similar to those of the solid state imaging apparatus 31 of FIG. 2 can be obtained, and it becomes possible to attempt a reduction of the chip size without increasing the wiring region, even in the case where the line sensors 41 are arranged parallel and adjacent to each other.

[Third Embodiment of a Solid State Imaging Apparatus Applicable to the Present Disclosure]

Figure 6:
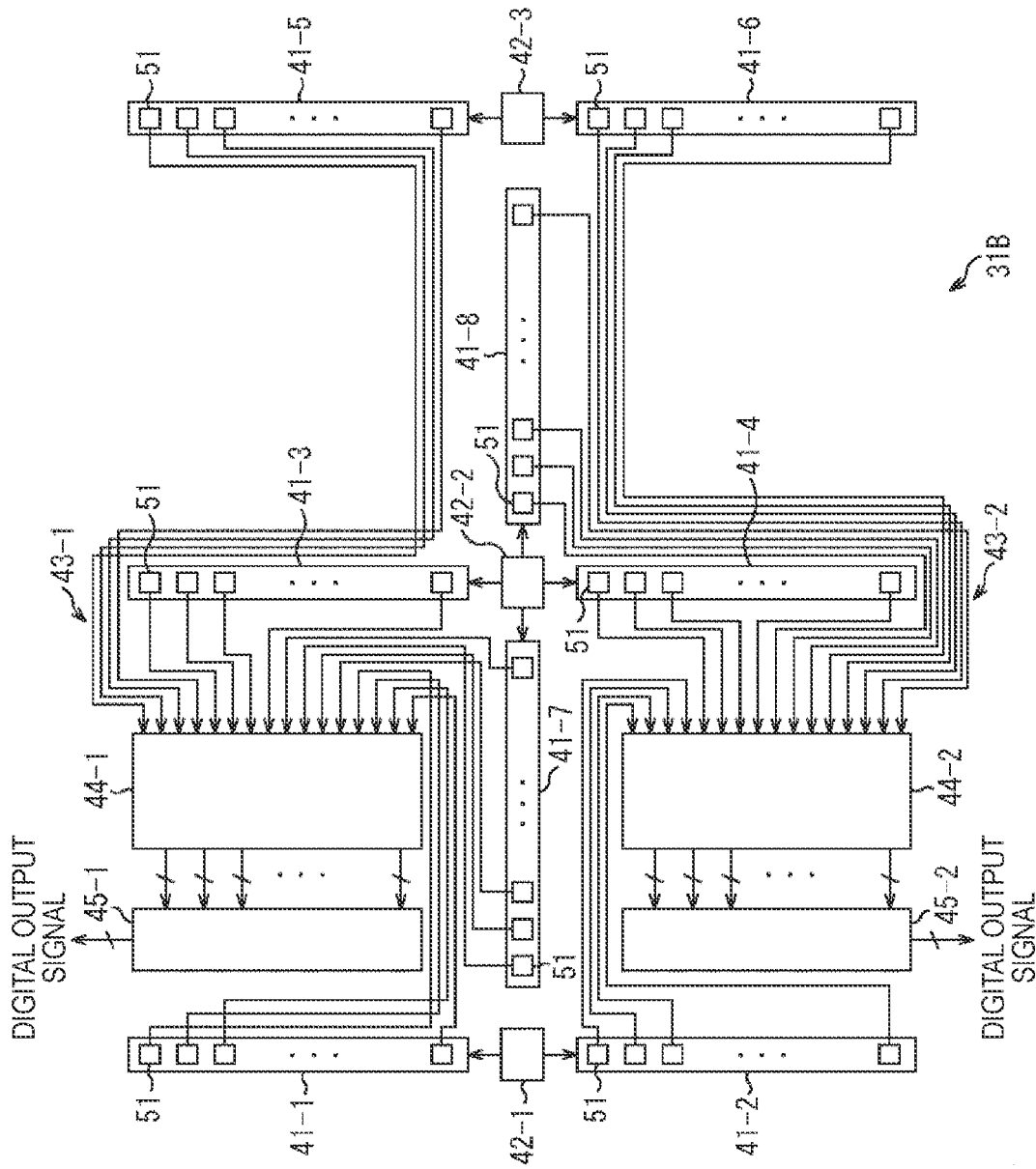
FIG. 6 is a figure which shows a configuration example of a third embodiment of a solid state imaging apparatus applicable to the present disclosure.

FIG. 6 is a figure which shows a configuration example of a third embodiment of a solid state imaging apparatus applicable to the present disclosure.

The solid state imaging apparatus 31B of FIG. 6 includes eight line sensors 41-1 to 41-8, pixel driving sections 42-1 to 42-3, pixel signal lines 43-1 and 43-2, column ADCs 44-1 and 44-2, and line memories 45-1 and 45-2. Note that in FIG. 6 the same reference numerals are attached to parts having functions the same as those of FIG. 2, and a description of these parts will be arbitrary omitted. Further, in FIG. 6 a branch number is attached for the sake of convenience to the reference numerals of each part, and will be described by arbitrary attaching the branch numbers.

In the solid state imaging apparatus 31B of FIG. 6, the line sensors 41-1, 41-3, 41-5, and 41-7 are arranged opposite (as a pair with) the line sensors 41-2, 41-4, 41-6, and 41-8, respectively. The paired line sensors 41 are discretely and symmetrically arranged, specifically, centered on the pixel driving section 42, so that the pixel lines of the pixels 51 are arrayed in a line in a horizontal or vertical direction.

Here, if one of the paired line sensors 41 (the line sensors 41-1, 41-3, 41-5, and 41-7) is called a main-line line sensor 41, and the other (line sensors 41-2, 41-4, 41-6, and 41-8) is called a sub-line line sensor 41, the signal of each pixel 51 of the main-line line sensors 41 is output to the column ADC 44-1 via the pixel signal lines 43-1, and the signal of each pixel 51 of the sub-line line sensors 41 is output to the column ADC 44-2 via the pixel signal lines 43-2.

Further, digital signals output from the column ADC 44-1 are supplied to the line memory 45-1, and digital signals output from the column ADC 44-2 are supplied to the line memory 45-2.

Also in the solid state imaging apparatus 31B of FIG. 6, the pixel signal lines 43 (43-1 and 43-2) are gathered and wired along a region in which a circuit block including a line sensor 41, that is, the line sensor 41, the column ADC 44, and the line memory 45, are arranged. The distance (pitch) between the gathered and wired pixel signal lines 43 is narrower than the distance (pitch) between the pixels 51 arrayed in the line sensors 41.

Note that in the solid state imaging apparatus 31B of FIG. 6, the column ADCs 44-1 and 44-2 are capable of operating simultaneously by a timing control signal from a control section, which is not shown in the figure. In this way, the signal of each pixel 51 of all the line sensors 41 can be AD converted in parallel while securing simultaneity.

Also in the above described configuration, functions and effects similar to those of the solid state imaging apparatus 31 of FIG. 2 can be obtained.

[Fourth Embodiment of a Solid State Imaging Apparatus Applicable to the Present Disclosure]

Figure 7:
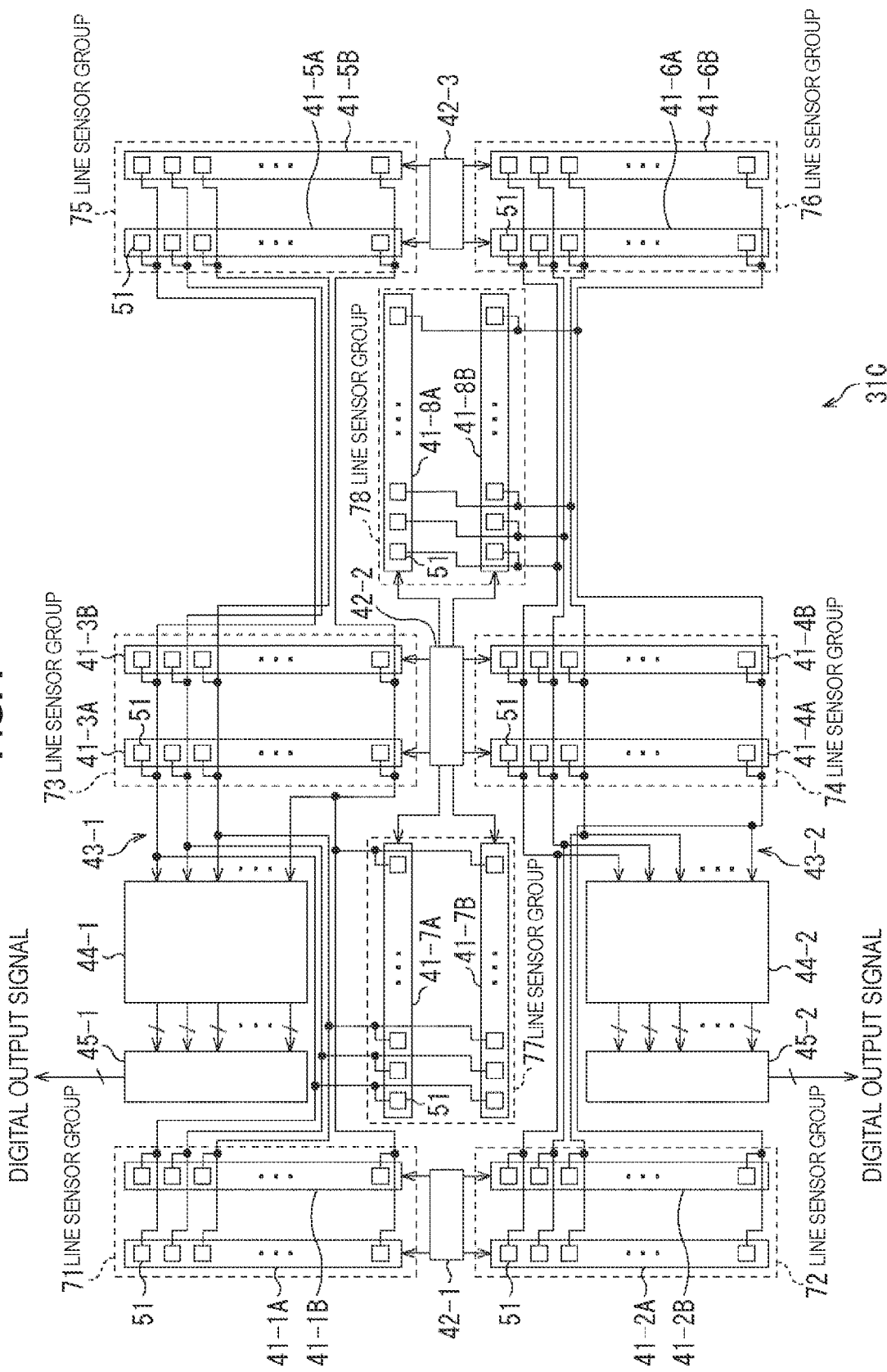
FIG. 7 is a figure which shows a configuration example of a fourth embodiment of a solid state imaging apparatus applicable to the present disclosure.

FIG. 7 is a figure which shows a configuration example of a third embodiment of a solid state imaging apparatus applicable to the present disclosure.

The solid state imaging apparatus 31C of FIG. 7 includes 16 line sensors 41-1A, 41-1B, . . . , 41-8A, and 41-8B, pixel driving section 42-1 to 42-3, pixel signal lines 43-1 and 43-2, column ADCs 44-1 and 44-2, and line memories 45-1 and 45-2. Note that in FIG. 7 the same reference numerals are attached to parts having functions the same as those of FIG. 6, and a description of these parts will be arbitrary omitted.

In the solid state imaging apparatus 31C of FIG. 7, the line sensors 41-1A, 41-1B, 41-3A, 41-3B, 41-5A, 41-5B, 41-7A, and 41-7B are arranged opposite (as a pair with) the line sensors 41-2A, 41-2B, 41-4A, 41-4B, 41-6A, 41-6B, 41-8A, and 41-8B, respectively. The paired line sensors 41 are discretely and symmetrically arranged, specifically, centered on the pixel driving section 42, so that the pixel lines of the pixels 51 are arrayed in a line in a horizontal or vertical direction.

Further, in the solid state imaging apparatus 31C of FIG. 7, a set of line sensors arranged locally and adjacent to each other are called a line sensor group. Specifically, the line sensors 41-1A and 41-1B are called line sensor group 71-1, and the line sensors 41-2A and 41-2B are called line sensor group 71-2. The other line sensors 41 are called similar line sensor groups.

Here as well, if one of the paired line sensors 41 (the line sensors 41-1A, 41-1B, 41-3A, 41-3B, 41-5A, 41-5B, 41-7A, and 41-7B) is called a main-line line sensor 41, and the other (line sensors 41-2A, 41-2B, 41-4A, 41-4B, 41-6A, 41-6B, 41-8A, and 41-8B) is called a sub-line line sensor 41, the signal of each pixel 51 of the main-line line sensors 41 is output to the column ADC 44-1 via the pixel signal lines 43-1, and the signal of each pixel 51 of the sub-line line sensors 41 is output to the column ADC 44-2 via the pixel signal lines 43-2.

Note that in the solid state imaging apparatus 31C of FIG. 7, the pixel signal lines 43 for reading the signal of each pixel 51 of one line sensor 41 (the line sensor 41 the furthest from the column ADC 44), out of the two line sensors 41 which constitute a line sensor group, are also wired extending over the other line sensor 41 (the line sensor 41 nearest to the column ADC 44).

Further, digital signals output from the column ADC 44-1 are supplied to the line memory 45-1, and digital signals output from the column ADC 44-2 are supplied to the line memory 45-2.

In addition, in the solid state imaging apparatus 31C of FIG. 7, the paired main-line line sensors 41 and sub-line line sensors 41 are selectively operated. In other words, in the solid state imaging apparatus 31C of FIG. 7, only one pair of line sensors 41 out of the eight pairs is selected to output the pixel signals.

Further, in the solid state imaging apparatus 31C of FIG. 7, the pixel signal lines 43 (43-1 and 43-2) are gathered and arranged along a region in which the circuit blocks including the line sensors 41 are arranged, and connect the main-line line sensors 41 and the sub-line line sensors 41 to the column ADCs 44-1 and 44-2, respectively, by sharing wiring on the side of the column ADCs 44-1 and 44-2.

Therefore, the column ADCs 44-1 and 44-2 may AD convert each pixel 51 of each of the selected main-line line sensor 41 and sub-line line sensor 41 in parallel, that is, only the signals of the number of pixels included by one line sensor 41. In this way, since the column number of the column ADC 44 is significantly reduced, the size of the column ADC 44 can be reduced.

Figure 8:
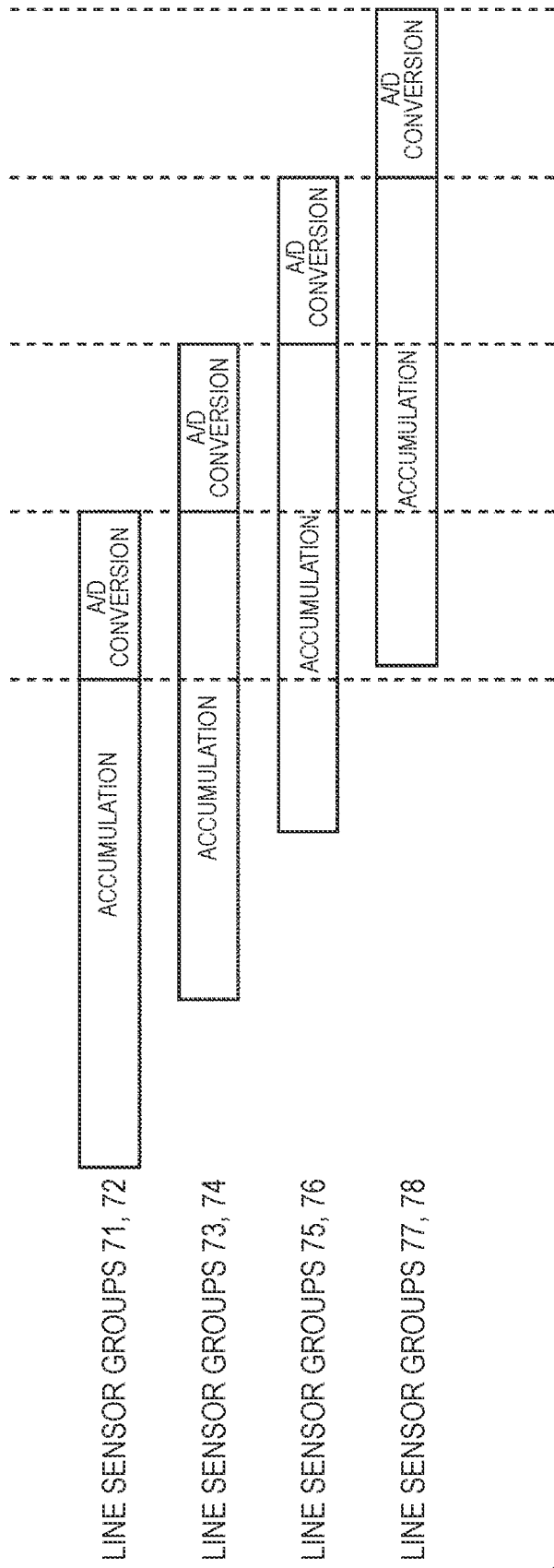
FIG. 8 is a figure which describes an example of the reading of line sensors.

FIG. 8 shows an example of the reading of line sensors 41 in the solid state imaging apparatus 31C of FIG. 6.

FIG. 8 shows an example in which line sensors 41 are selected in the order of the pair of line sensor groups 71 and 72, the pair of line sensor groups 73 and 74, the pair of line sensor groups 75 and 76, and the pair of line sensor groups 77 and 78, and reading (AD conversion) is performed. Note that the selected pair of line sensors 41 is one pair out of each line sensor group. Further, here, an accumulation time of all the line sensors 41 is set to be the same.

In the example of FIG. 8, since the column ADC 44 performs AD conversion by a pipeline process, the accumulation of the line sensors 41 in each line sensor group is sequentially started in accordance with the time taken for the AD conversion.

In the case where the accumulation times of all the line sensors 41 are the same, a reading with the shortest time can be performed by the operation sequence shown in FIG. 8.

Figure 9:
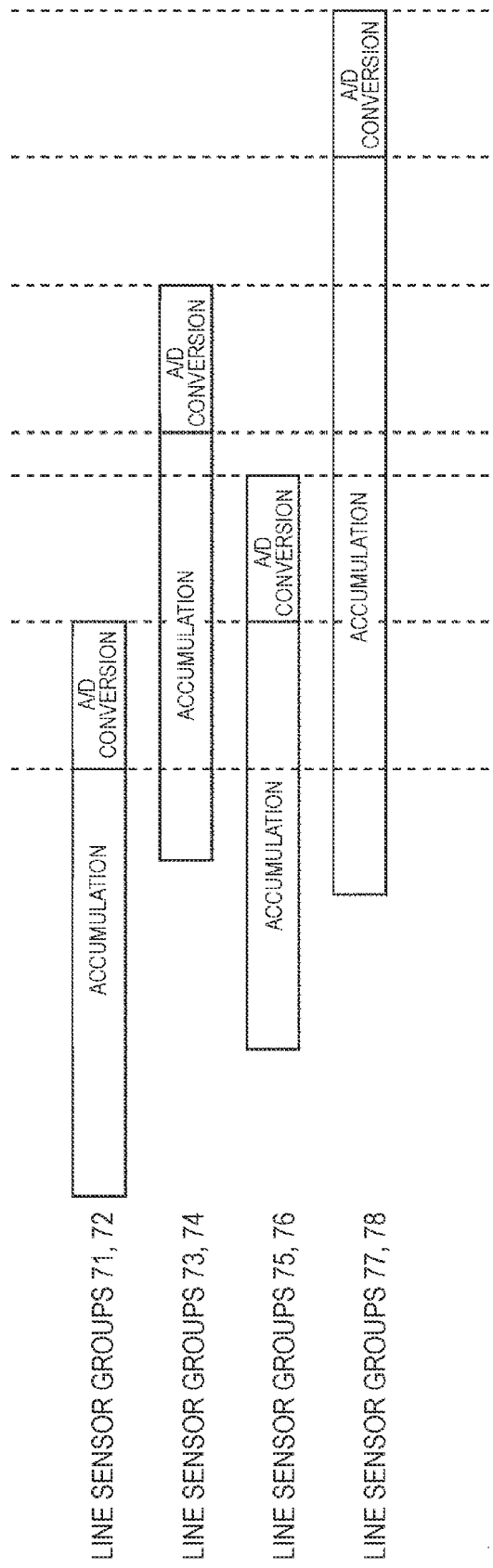
FIG. 9 is a figure which describes another example of the reading of line sensors.

Further, in the case where the accumulation times of the line sensors 41 are set to be different times, reading may be performed by changing this order and timing, as shown in FIG. 9, so that the timing of AD conversions do not overlap.

Note that in the solid state imaging apparatus 31C of FIG. 7, the selection of the paired line sensors 41 is controlled according to a driving signal SEL by the pixel driving section 42.

In addition, in the solid state imaging apparatus 31C of FIG. 7, which pair of line sensor groups is selected, or which pair is selected by arranging a line sensor group, is determined according to how the focus is taken at which region within a screen.

According to the above described configuration, it becomes possible to attempt a reduction of the chip size, which can reduce the wiring region, by sharing one part of the wiring of the pixel signal lines 43.

In addition, in the configuration of FIG. 7, since each pixel 51 of the selected paired line sensors 41 is read sequentially and in parallel with each other, instead of each pixel 51 of all the line sensors 41 being read in parallel with each other, the column number of the column ADCs 44-1 and 44-2 can each be reduced up to the number of pixels included by one line sensor 41. In this way, it is possible to attempt a further reduction of the chip size and to also decrease the power consumption, which can reduce the size of the column ADCs 44.

Note that in the configuration of FIG. 7, while the reading of the selected paired line sensors 41 is performed sequentially, since the time which may be necessary for reading (AD conversion) by the column ADCs 44 is from several microseconds to ten and several microseconds per time, simultaneity and high speed performance are not significantly impaired.

Further, since the reading of the selected paired line sensors 41 is performed sequentially, the gain of the AD conversion can be changed for each read pair. In this way, for example, this sensitivity can be improved by raising the gain for the line sensors near the outer periphery of the chip, where optically the amount of incident light is low.

Note that in the solid state imaging apparatus 31C of FIG. 7, while the line sensor groups are configured to have two respective line sensors, they may be configured to have three or more line sensors.

Further, in the solid state imaging apparatus 31C of FIG. 7, while each line sensor 41 is arranged as a line sensor group, the line sensors 41 may be arranged as a single unit.

Incidentally, in the solid state imaging apparatus 31C of FIG. 7, in the case where the number of line sensors increases, and in the case where the line sensors are arranged in mutually separated positions, the parasitic capacitance and the parasitic resistance of the pixel signal lines 43 increases, and time may be necessary for stabilization (settling) of the pixel signals which the pixel signal lines 43 transmit. In order for this settling to improve, an increase in current may be necessary, and as a result, the power consumption may increase.

Accordingly, hereinafter a configuration will be described which controls an increase of the power consumption in accordance with the above described settling.

[Fifth Embodiment of a Solid State Imaging Apparatus Applicable to the Present Disclosure]

Figure 10:
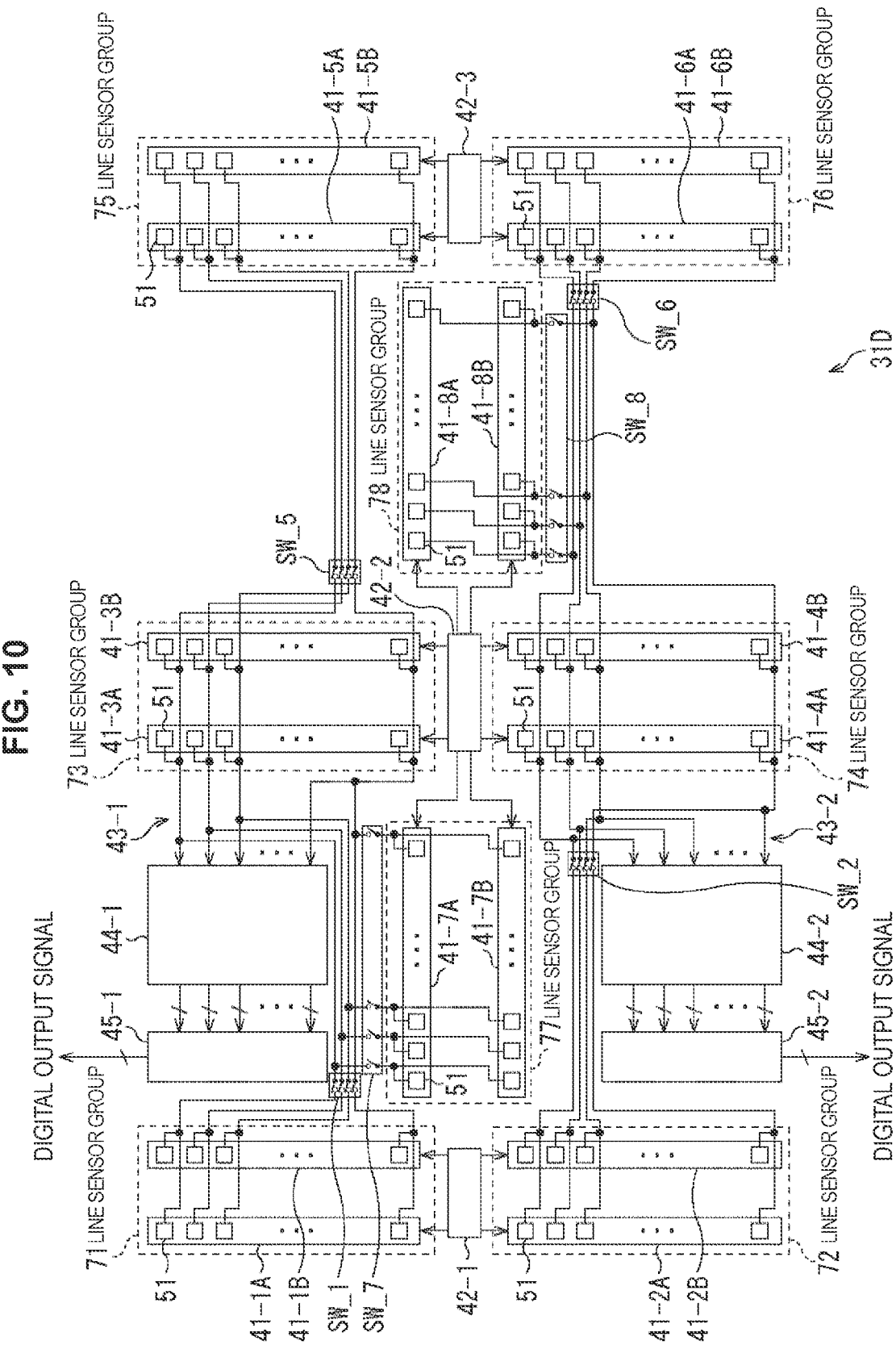
FIG. 10 is a figure which shows a configuration example of a fifth embodiment of a solid state imaging apparatus applicable to the present disclosure.

FIG. 10 is a figure which shows a configuration example of a fifth embodiment of a solid state imaging apparatus applicable to the present disclosure.

The solid state imaging apparatus 31D of FIG. 10 includes, in addition to a configuration similar to that of the solid state imaging apparatus 31C of FIG. 7, switches SW_1, SW_2, SW_5, SW_6, SW_7, and SW_8. Note that hereinafter, in the case where each of the switches SW_1, SW_2, SW_5, SW_6, SW_7, and SW_8 are not distinguished, they will simply be called switches SW.

The switch SW_1 is installed in a wiring part, which is not shared with the pixels of the other line sensor groups, from among the wiring of the pixel signal lines 43-1 connecting each pixel 51 of the line sensor group 71 (the line sensors 41-1A and 41-1B) to the column ADC 44-1. The switch SW_1 turns the connection between each pixel 51 of the line sensor group 71 and the column ADC 44-1 on/off.

Further, the switch SW_2 is installed in a wiring part, which is not shared with the pixels of the other line sensor groups, from among the wiring of the pixel signal lines 43-2 connecting each pixel 51 of the line sensor group 72 (the line sensors 41-2A and 41-2B) to the column ADC 44-2. The switch SW_2 turns the connection between each pixel 51 of the line sensor group 72 and the column ADC 44-2 on/off.

Similarly, the switch SW_5, the switch SW_6, the switch SW_7, and the switch SW_8 are installed for the line sensor group 75, the line sensor group 76, the line sensor group 77, and the line sensor group 78, respectively. Note that switches SW are not installed for the line sensor groups 73 and 74.

Figure 11:
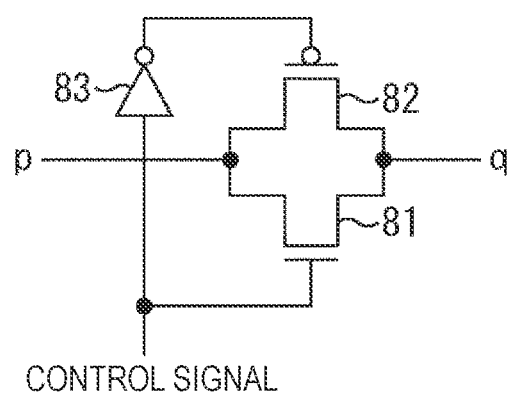
FIG. 11 is a figure which shows a configuration example of a switch.

FIG. 11 is a figure which shows a configuration example of a switch SW.

The switch SW is configured to have transistors 81 and 82, and a NOT gate 83. When a control signal from a control section, which is not shown in the figure, is input (becomes an H level) for the NOT gate 83, the transistors 81 and 82 operate as switches, and conduct between p-q.

Note that the configuration of the switch SW is not limited to the configuration shown in FIG. 11, and may be another configuration.

Figure 12:
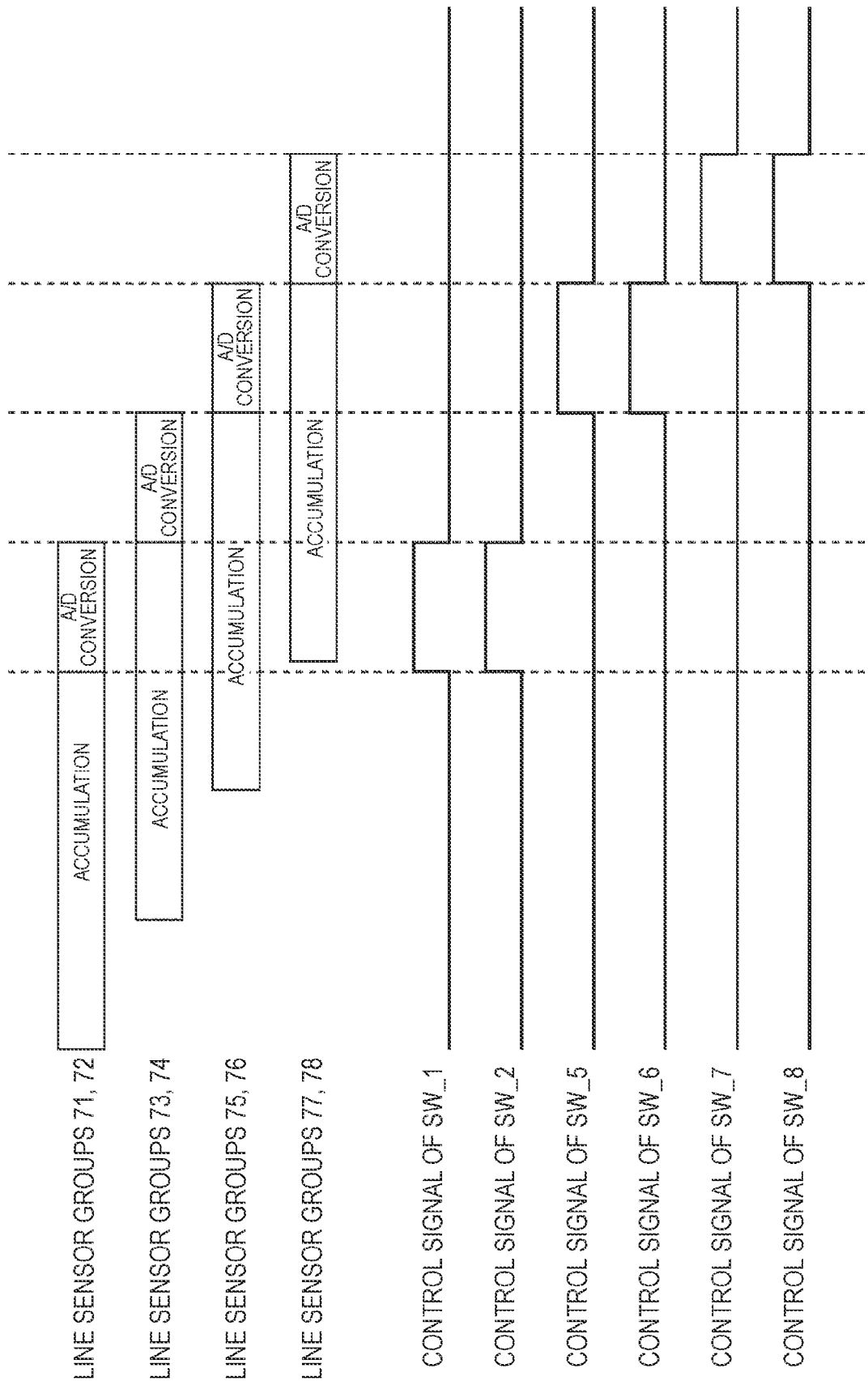
FIG. 12 is a figure which describes an example of the reading of line sensors.

FIG. 12 shows an example of the reading of line sensors 41 in the solid state imaging apparatus 31D of FIG. 10.

Here, reading (AD conversion) is performed by an operation sequence similar to that of FIG. 8.

In the example of FIG. 12, the switches SW_1 and SW_2 are turned on due to the control signals of the switches SW_1 and SW_2 becoming H signals, and reading (AD conversion) of the pair of line sensor groups 71 and 72 is performed by the column ADCs 44-1 and 44-2.

Further, the switches SW_5 and SW_6 are turned on due to the control signals of the switches SW_5 and SW_6 becoming H signals, and reading (AD conversion) of the pair of line sensor groups 75 and 76 is performed by the column ADCs 44-1 and 44-2.

In addition, the switches SW_7 and SW_8 are turned on due to the control signals of the switches SW_7 and SW_8 becoming H signals, and reading (AD conversion) of the pair of line sensor groups 77 and 78 is performed by the column ADCs 44-1 and 44-2.

Further, while switches SW are not installed for the line sensor groups 73 and 74, reading (AD conversion) of the pair of line sensor groups 73 and 74 is performed by the column ADCs 44-1 and 44-2, by a driving signal SEL from the pixel driving section 42 being supplied for each pixel 51 of the pair of line sensor groups 73 and 74.

Note that in the solid state imaging apparatus 31D of FIG. 10, reading (AD conversion) of the pair of line sensor groups 73 and 74 may be performed by installing switches SW_3 and SW_4 for the line sensor groups 73 and 74, respectively.

According to the above described configuration, only the line sensors 41 to which reading is performed are electrically connected with the column ADCs 44, and the other line sensors 41 are electrically disconnected from the column ADCs 44. In this way, the influence of parasitic capacitance and parasitic resistance of the pixel signal lines 43 becomes negligibly small, and as a result, an increase of power consumption for improving settling in the pixel signal lines can be controlled.

[Sixth Embodiment of a Solid State Imaging Apparatus Applicable to the Present Disclosure]

Figure 13:
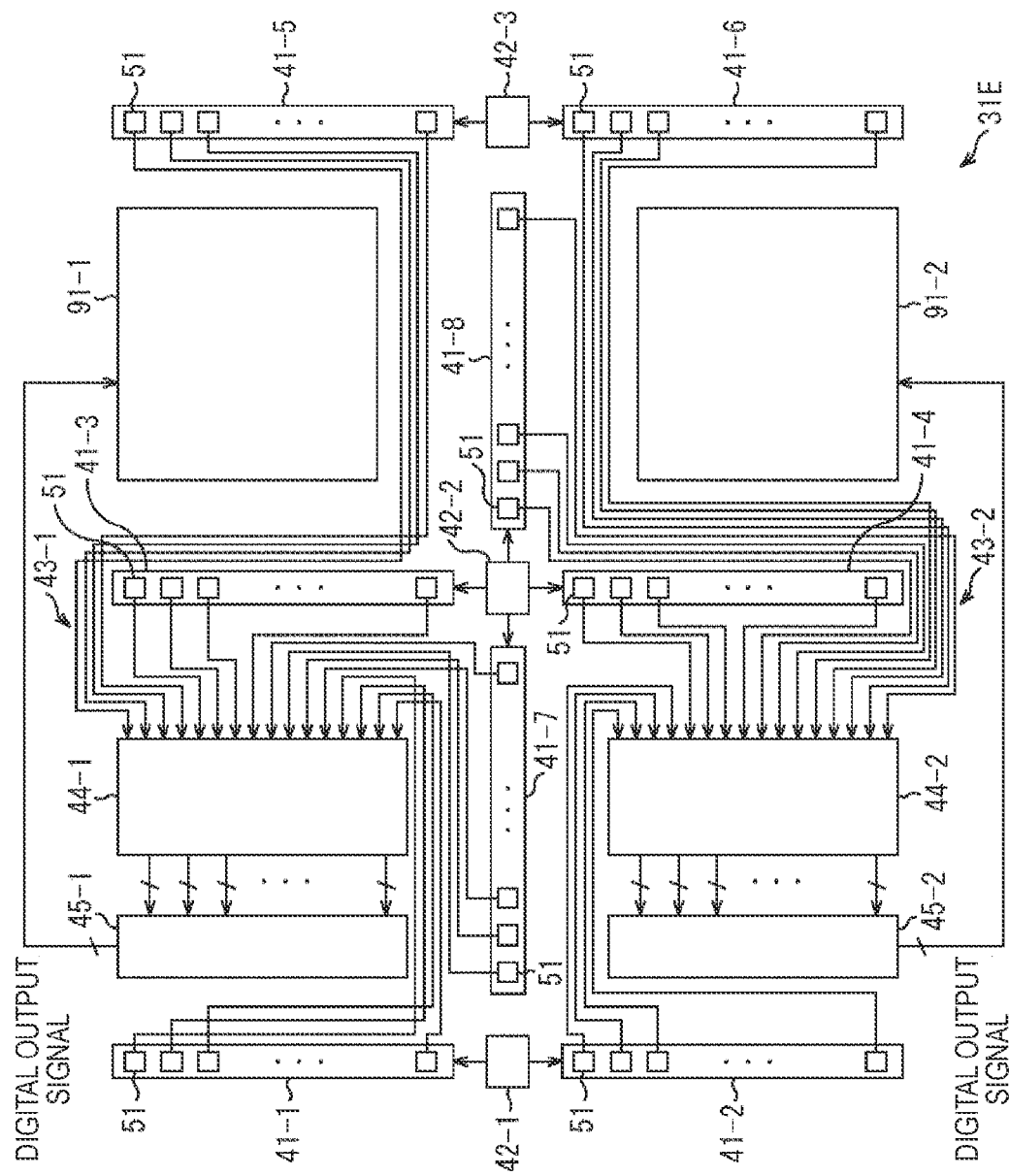
FIG. 13 is a figure which shows a configuration example of a sixth embodiment of a solid state imaging apparatus applicable to the present disclosure.

FIG. 13 is a figure which shows a configuration example of a sixth embodiment of a solid state imaging apparatus applicable to the present disclosure.

The solid state imaging apparatus 31E of FIG. 13 includes, in addition to a configuration similar to that of the solid state imaging apparatus 31B of FIG. 6, digital memory and signal processing circuits 91-1 and 91-2 in empty regions on the chip of the solid state imaging apparatus 31B of FIG. 6.

The digital memory and signal processing circuits 91-1 and 91-2 retain part or all of the output data (pixel signals) of each line sensor 41, which is supplied from the line memories 45-1 and 45-2 as digital output signals. Further, the digital memory and signal processing circuits 91-1 and 91-2 apply a prescribed signal process at a prescribed timing to the retained output signals of each line sensor 41.

In an AF sensor using a CCD of the related art, since a reading process is performed entirely in analog, AD conversion of the read signals is performed and a prescribed signal process is applied by a micro controller or the like mounted on a set. Accordingly, the surface mounted components on the set increases, and the design of the control sequence is complex.

On the other hand, according to the above described configuration, since the digital memory and signal processing circuits 91-1 and 91-2 can be integrated on the same chip as the line sensors 41 and the like, a very simple system can be provided.

Further, since a prescribed signal process can be applied at a prescribed timing to the output data of each line sensor 41 by the digital memory and signal processing circuits 91-1 and 91-2, the output data of each line sensor 41 can be arbitrary read without a restriction of time, and it becomes possible to achieve operation processes, such as peak detection in the AF, with one chip.

[Seventh Embodiment of a Solid State Imaging Apparatus Applicable to the Present Disclosure]

Figure 14:
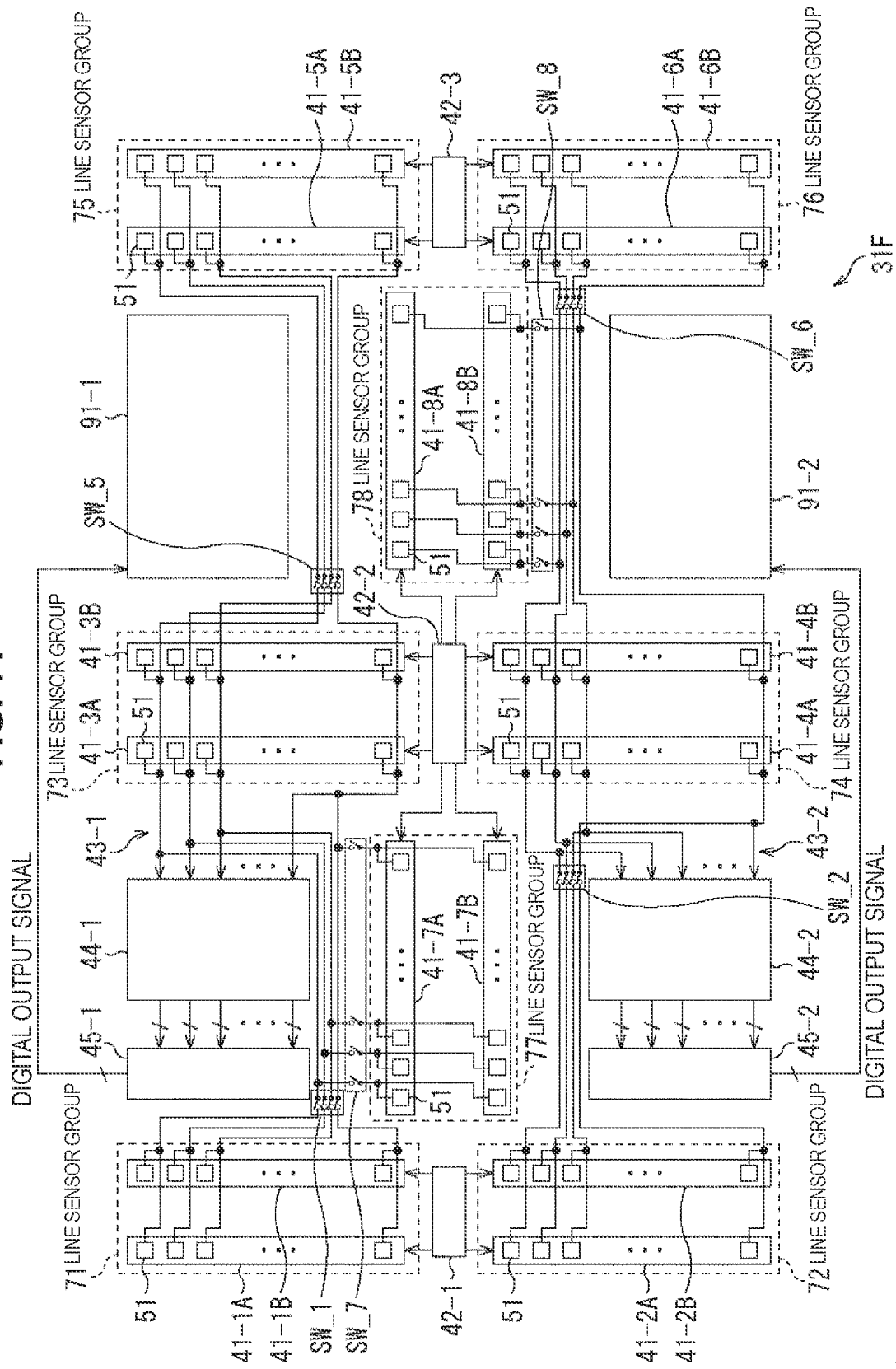
FIG. 14 is a figure which shows a configuration example of a seventh embodiment of a solid state imaging apparatus applicable to the present disclosure.

FIG. 14 is a figure which shows a configuration example of a seventh embodiment of a solid state imaging apparatus applicable to the present disclosure.

The solid state imaging apparatus 31F of FIG. 14 includes, in addition to a configuration similar to that of the solid state imaging apparatus 31D of FIG. 10, digital memory and signal processing circuits 91-1 and 91-2 in empty regions on the chip of the solid state imaging apparatus 31D of FIG. 10.

Also in the above described configuration, since the digital memory and signal processing circuits 91-1 and 91-2 can be integrated on the same chip as the line sensors 41 and the like, a very simple system can be provided.

Note that in the embodiments of the solid state imaging apparatus applicable to the present disclosure as described above, the shield wiring can of course be wired close to the pixel signal lines 43, and the line sensor groups in configurations which include line sensor groups can of course be replaced with single line sensor unit.

Further, in the solid state imaging apparatus 31B of FIG. 6, the solid state imaging apparatus 31C of FIG. 7 and the like, while arrangements are made, such as pixel lines of the pixels 51 arrayed in a line in a horizontal direction or a vertical direction, as an arrangement of discrete line sensors 41, it is not limited to this, and an arrangement may be made, such as pixel lines arrayed in a line in a diagonal direction, for example.

[Embodiment of an Electronic Apparatus Applicable to the Present Disclosure]

The solid state imaging apparatus according to an embodiment of the present disclosure is capable of being applied to a general electronic apparatus which uses the solid state imaging apparatus in an image capturing section (photoelectric conversion section), such as an imaging apparatus such as a digital still camera or video camera, a portable terminal apparatus having an imaging function, or a copier machine which uses a solid state imaging apparatus in an imaging reading section. The solid state imaging apparatus may have a configuration which is formed as one chip, or may have a module shaped configuration having an imaging function, in which an imaging section and a signal processing section or optical system are consolidated and packaged.

Figure 15:
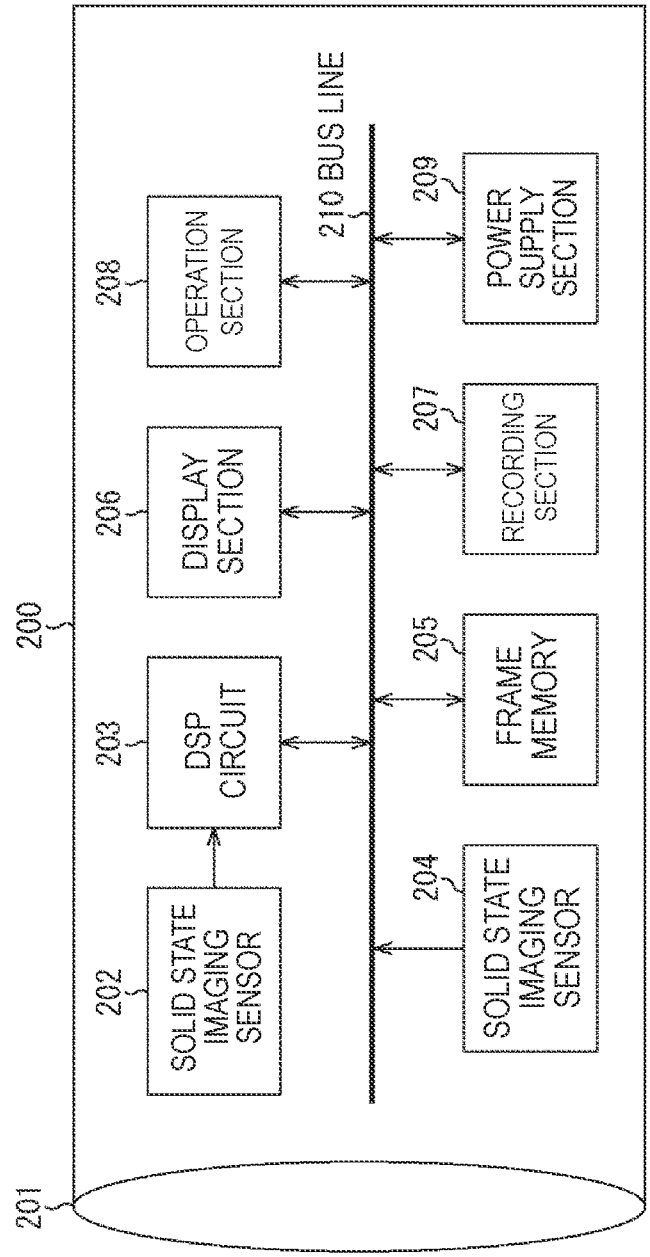
FIG. 15 is a block diagram which shows a configuration example of an embodiment of an electronic apparatus applicable to the present disclosure.

FIG. 15 is a block diagram which shows a configuration example of an embodiment of an imaging apparatus as an electronic apparatus applicable to the present disclosure.

The imaging apparatus 200 of FIG. 15 includes an optical section 201 which constitutes a lens group or the like such as an imaging lens, a solid state imaging sensor 202 which images a photographic subject, a DSP circuit 203 which is a camera signal processing circuit, and a solid state imaging sensor 204 in which a plurality of the above described line sensors 41 are arranged in pairs. Further, the imaging apparatus 200 also includes a frame memory 205, a display section 206, a recording section 207, an operation section 208, and a power supply section 209. The DSP circuit 203, the solid state imaging sensor 204, the frame memory 205, the display section 206, the recording section 207, the operation section 208, and the power supply section 209 are mutually connected via a bus line 210.

The optical section 201 forms an image on an imaging surface of the solid state imaging sensor 202 by taking in incident light (image light) from a photographic subject, and forms images on the paired line sensors 41 by the solid state imaging sensor 204 via a separator lens.

The solid state imaging sensor 202 converts the amount of incident light forming the image on the imaging surface by the optical section 201 into an electrical signal with a pixel unit, and outputs the electrical signal as a pixel signal.

The solid state imaging sensor 204 outputs a control signal for driving the imaging lens to be focused by calculating a deviation amount of the focus from the imaging lens in the optical section 201, based on the photographic subject forming images on the paired line sensors 41 by the optical section 201. A solid state imaging apparatus such as the solid state imaging apparatus 31 according to the above described embodiments can be used as this solid state imaging sensor 204.

The display section 206 is constituted of, for example, a panel type display apparatus such as a liquid crystal panel or an organic EL (Electro Luminescence) panel, and displays a moving image or a still image imaged by the solid state imaging sensor 202. The recording section 207 records the moving image or still image imaged by the solid state imaging sensor 202 to a recording medium such as a video tape or a DVD (Digital Versatile Disk).

The operation section 208 issues operation instructions for the various functions of the imaging apparatus 200, under operations by a user. The power supply section 209 arbitrary supplies various power supplies, which become the operation power supplies of the DSP circuit 203, the frame memory 205, the display section 206, the recording section 207, and the operation section 208, to these supply targets.

As described above, an AF function with high precision can be provided and a reduction in the size of the imaging apparatus 200 can be attempted, by using a solid state imaging apparatus 31, which is more suitable in an AF sensor and which implements a reduction in chip size, as the solid state imaging sensor 204.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A solid state imaging apparatus, including:

a plurality of line sensors including a plurality of pixels arrayed in a line, each of the pixels including an amplifier which amplifies a signal corresponding to a charge accumulated in a photoelectric transducer; and signal lines each for reading a signal of each pixel of the line sensors, wherein the plurality of line sensors are discretely arranged, and wherein the signal lines are gathered and wired along a region in which a circuit block including the line sensors is arranged.

(2)

The solid state imaging apparatus according to (1), wherein a distance between the gathered and wired signal lines is narrower than a distance between the pixels arrayed in the line sensors.

(3)
The solid state imaging apparatus according to (1) or (2), further including:
 a parallel type A/D convertor capable of A/D converting the signal of each pixel of the plurality of line sensors in parallel,
 wherein the signal lines connect each pixel of the plurality of line sensors to the A/D convertor.
(4)
The solid state imaging apparatus according to (3),
 wherein the A/D convertor A/D converts the signal of each pixel of all the line sensors in parallel.
(5)
The solid state imaging apparatus according to (3),
 wherein the plurality of line sensors are each selectively operated,
 wherein the signal lines connect each pixel of the plurality of line sensors to the A/D convertor by sharing wiring on the A/D convertor side for each corresponding pixel between the plurality of line sensors, and
 wherein the A/D convertor A/D converts the signal of each pixel of the selected line sensors in parallel.
(6)
The solid state imaging apparatus according to (5),
 wherein in the signal lines on a wiring part which is not shared with the pixels of other line sensors, a switch is provided which controls connection and disconnection between each pixel and the A/D convertor for each line sensor, and
 wherein the A/D convertor A/D converts the signal of each pixel of the line sensors corresponding to the signal lines where the switch is turned on in parallel.
(7)
The solid state imaging apparatus according to any one of (3) to (6), further including:
 a line memory which holds a digital signal output by the A/D convertor.
(8)
The solid state imaging apparatus according to any one of (3) to (7), further including:
 a signal processing circuit which applies a prescribed signal process to a digital signal output by the A/D convertor.
(9)
The solid state imaging apparatus according to any one of (1) to (8),
 wherein a shield line connected to a power supply potential or a ground potential is additionally wired close to a region where the signal lines are gathered and wired.
(10)
The solid state imaging apparatus according to any one of (1) to (9),
 wherein in a case where at least some of the plurality of line sensors are arranged in parallel and adjacent to each other, the signal lines each reading the signal of each pixel of one of the line sensors is wired extending over the other line sensors.
(11)
The solid state imaging apparatus according to any one of (1) to (10),
 wherein one of the line sensors of the plurality of line sensors is arranged in a pair with another of the line sensors, and
 wherein the paired line sensors are arranged so that pixel lines arrayed in each of the paired line sensors are arrayed in a line in a prescribed direction.
(12)
The solid state imaging apparatus according to any one of (1) to (11),
 wherein the line sensors are complementary metal oxide semiconductor (CMOS) image sensors.
(13)
An electronic apparatus, including:
 a solid state imaging apparatus including
  a plurality of line sensors including a plurality of pixels arrayed in a line, each of the pixels including an amplifier which amplifies a signal corresponding to a charge accumulated in a photoelectric transducer; and
  signal lines each for reading a signal of each pixel of the line sensors,
 wherein the plurality of line sensors are discretely arranged, and
 wherein the signal lines are gathered and wired along a region in which a circuit block including the line sensors is arranged.
(14)
A method for reading pixels performed by a solid state imaging apparatus, the solid state imaging apparatus including
 a plurality of line sensors including a plurality of pixels arrayed in a line, each of the pixels including an amplifier which amplifies a signal corresponding to a charge accumulated in a photoelectric transducer,
 signal lines each for reading a signal of each pixel of the line sensors,
 a parallel type A/D convertor capable of A/D converting the signal of each pixel of the plurality of line sensors in parallel, and
 a switch provided on the line sensors side of the signal lines, the switch controlling connection and disconnection between each pixel and the A/D convertor for each line sensor,
 wherein the plurality of line sensors are discretely arranged, and
 wherein the signal lines are gathered and wired along a region in which a circuit block including the line sensors is arranged, and which connect each pixel of the plurality of line sensors to the A/D convertor by sharing wiring on the A/D convertor side for each corresponding pixel between the plurality of line sensors, the method including:
 A/D converting the signal of each pixel of the line sensors corresponding to the signal lines where the switch is turned on in parallel.

The present disclosure contains subject matter related to that disclosed in Japanese Priority Patent Application JP 2012-151662 filed in the Japan Patent Office on Jul. 5, 2012, the entire content of which is hereby incorporated by reference.

What is claimed is:
1. A solid state imaging apparatus, comprising:
 a plurality of line sensors, each line sensor including a plurality of pixels arrayed in a line, each of the plurality of pixels including an amplifier which amplifies a signal corresponding to a charge accumulated in a photoelectric transducer;
 a plurality of signal lines electrically coupled to each line sensor, each signal line being electrically coupled to a corresponding pixel; and
 an Analog-to-Digital (A/D) convertor in communication with the plurality of line sensors,
 wherein,
  the plurality of line sensors are discretely arranged with at least a first line sensor having a first orientation and a second line sensor having a second orientation, the first orientation being different from the second orientation, and
  the plurality of signal lines are gathered and wired in a region between the plurality of line sensors and the A/D convertor.

2. The solid state imaging apparatus according to claim 1, wherein a distance between the gathered and wired signal lines of the first line sensor is narrower than a distance between the plurality of pixels arrayed in the first line sensor.

3. The solid state imaging apparatus according to claim 1, wherein the A/D convertor is a parallel type A/D convertor configured to perform analog-to-digital conversion of the signals of at least some of the plurality of line sensors in parallel.

4. The solid state imaging apparatus according to claim 3, wherein the A/D convertor is configured to convert the signals of the plurality of pixels of all of the plurality of line sensors in parallel.

5. The solid state imaging apparatus according to claim 3, wherein:
   each of the plurality of line sensors is selectively operated,
   the plurality of signal lines of at least some of the plurality of line sensors connect to the A/D convertor by sharing wiring at an input side of the A/D convertor, and
   the A/D convertor is configured to perform analog-to-digital conversion of the signals of the plurality of pixels of the selected line sensors in parallel.

6. The solid state imaging apparatus according to claim 1, wherein:
   the plurality of line sensors are arranged in line sensor groups;
   a switch is provided for each line sensor group to control connection and disconnection between each pixel of the respective line sensor group and the A/D convertor, and
   the A/D convertor is configured to perform analog-to-digital conversion of the signals of the plurality of pixels of at least one of the line sensors of a respective line sensor group in parallel when the respective switch is turned on.

7. The solid state imaging apparatus according to claim 3, further comprising:
   a line memory configured to store a digital signal output by the A/D convertor.

8. The solid state imaging apparatus according to claim 3, further comprising:
   a signal processing circuit configured to apply a prescribed signal process to a digital signal output by the A/D convertor.

9. The solid state imaging apparatus according to claim 1, further comprising:
   a shield line connected to a power supply potential or a ground potential, the shield line being adjacent to the region where the plurality of signal lines are gathered and wired.

10. The solid state imaging apparatus according to claim 1, wherein:
    at least some of the plurality of line sensors are arranged parallel and adjacent to each other, and
    the plurality of signal lines of one of the plurality of line sensors extends over another one of the plurality of line sensors.

11. The solid state imaging apparatus according to claim 1, wherein:
    one of the plurality of line sensors is arranged in a pair with another one of the plurality of line sensors, and
    the paired line sensors are arranged so that the plurality of pixels arrayed in each of the paired line sensors are arrayed in a prescribed direction.

12. The solid state imaging apparatus according to claim 1, wherein the plurality of line sensors are complementary metal oxide semiconductor (CMOS) image sensors.

13. An electronic apparatus, comprising:
    a solid state imaging apparatus including
        a plurality of line sensors, each line sensor including a plurality of pixels arrayed in a line, each of the plurality of pixels including an amplifier which amplifies a signal corresponding to a charge accumulated in a photoelectric transducer;
        a plurality of signal lines electrically coupled to each line sensor, each signal line being electrically coupled to a corresponding pixel; and
        an Analog-to-Digital (A/D) convertor in communication with the plurality of line sensors,
    wherein,
        the plurality of line sensors are discretely arranged with at least a first line sensor having a first orientation and a second line sensor having a second orientation, the first orientation being different from the second orientation, and
        the plurality of signal lines are gathered and wired in a region between the plurality of line sensors and the A/D convertor.

14. A method for reading pixels performed by a solid state imaging apparatus, the solid state imaging apparatus including a plurality of line sensors, each line sensor including a plurality of pixels arrayed in a line, each of the plurality of pixels including an amplifier which amplifies a signal corresponding to a charge accumulated in a photoelectric transducer, the plurality of line sensors are arranged in line sensor groups;
    a plurality of signal lines electrically coupled to each line sensor, each signal line being electrically coupled to a corresponding pixel,
    a parallel type A/D convertor configured to perform analog-to-digital conversion of the signals of the plurality of pixels of at least one of the plurality of line sensors in parallel, and
    a switch provided for each line sensor group, each switch controlling connection and disconnection between each pixel of its line sensor group and the A/D convertor,
wherein,
    the plurality of line sensors are discretely arranged with at least a first line sensor having a first orientation and a second line sensor having a second orientation, the first orientation being different from the second orientation,
    the plurality of signal lines are gathered and wired along in a region between the plurality of line sensors and the parallel type A/D convertor,
    the plurality of signal lines connect each pixel of at least some of the plurality of line sensors to the A/D convertor by sharing wiring at an input side of the parallel type A/D convertor,
the method comprising:
    performing analog-to-digital conversion of the signals of the plurality of pixels of at least one of the line sensors of a respective line sensor group in parallel when the respective switch is turned on.

* * * * *